United States Patent [19]

Alafandi et al.

[11] 4,240,932

[45] * Dec. 23, 1980

[54] EXCHANGED MORDENITE CATALYSTS AND PROCESSES FOR PRODUCING THE SAME

[75] Inventors: Hamid Alafandi, Woodland Hills; Dennis Stamires, Newport Beach, both of Calif.

[73] Assignee: Filtrol Corporation, Los Angeles, Calif.

[*] Notice: The portion of the term of this patent subsequent to Nov. 15, 1994, has been disclaimed.

[21] Appl. No.: 4,304

[22] Filed: Jan. 18, 1979

[51] Int. Cl.³ .................................................. B01J 29/18
[52] U.S. Cl. ............................... 252/455 Z; 423/112
[58] Field of Search ................... 252/455 Z; 423/112, 423/118

[56] References Cited

U.S. PATENT DOCUMENTS

| | | | |
|---|---|---|---|
| 3,537,816 | 11/1970 | Moscou | 423/112 |
| 3,794,598 | 2/1974 | Schlaffer | 252/455 Z |
| 4,058,484 | 11/1977 | Alafandi et al. | 252/455 Z |
| 4,085,069 | 4/1978 | Alafandi et al. | 252/455 Z |

*Primary Examiner*—Carl F. Dees
*Attorney, Agent, or Firm*—Subkow and Kriegel

[57] ABSTRACT

This invention relates to exchanged mordenite and catalysts employing the same.

4 Claims, No Drawings

EXCHANGED MORDENITE CATALYSTS AND PROCESSES FOR PRODUCING THE SAME

BACKGROUND OF THE INVENTION

Mordenite has been suggested for use as cracking catalysts (see Breck, "Zeolite Molecular Sieves", Wiley and Sons (1974), pages 122–124, and pages 162–163).

The typical oxide formula of such mordenite may be composed of the following molar oxide ratios:

$$Na_2O:Al_2O_3:10\ SiO_2$$

and the Si/Al ratio may vary from 4 to 5 (see Breck, page 162, supra).

The sodium content may be reduced by exchange. Thus the hydrogen form may be produced through exchange with acids or ammonium salts followed by calcination (see U.S. Pat. No. 3,527,826).

Applicants have found that they may produce superior results in the case of the zeolites of the faujasite type by exchanging the zeolite under pressure. They have been able to reduce the sodium content of the zeolite and improve its hydrohydrothermal stability by exchanging the zeolite under autogenious pressure above the normal boiling point. This may be done without materially adversely affecting the crystalline structure of the zeolite (see U.S. Pat. No. 4,058,484 filed Sept. 9, 1976 patented Nov. 15, 1977 and U.S. Pat. No. 4,085,069) filed Aug. 27, 1976, patented Apr. 18, 1978. See also, applications Ser. No. 808,268, filed June 20, 1977; Ser. No. 869,856, filed June 16, 1978 now U.S. Pat. No. 4,192,758; and Ser. No. 874,754, filed Feb. 3, 1978 now U.S. Pat. No. 4,164,483.

STATEMENT OF THE INVENTION

According to our invention mordenite, both the small port type and the large port type is exchanged under autogenious pressure at a temperature above its atmospheric boiling point to reduce the sodium content of the mordenite and to improve its catalytic activity. Mordenite, depending on its $SiO_2/Al_2O_3$ ratio and whether or not it has been leached to remove $Al_2O_3$ may range from about 5% to 10% by weight of the zeolite expressed as $Na_2O$ on a volatile free basis. The degree of exchange and attainable catalytic activity is superior to that obtainable by multiple exchange at temperatures up to its boiling point at atmospheric pressure. The sodium content of the mordenite may be reduced to less than 2% expressed as $Na_2O$ on a volatile free basis. The sodium containing mordenite is exchanged according to our invention under autogenious superatmospheric pressure at temperatures of about 250° F. to up to about 500° F. and preferably up to about 450° F. for a time sufficient to reduce the sodium content of the mordenite to less than about 2% expressed as $Na_2O$ based on the exchanged mordenite on a volatile free basis.

The exchange may be made employing acid such as HCl, $HNO_3$, and $H_2SO_4$ or salts, for example, the sulfate, chloride or nitrate salts of ammonia or other monovalent cations other than alkaline metal cations, or polyvalent metals of the transition elements of Groups 3b to 7b or 8 of the Periodic Table, and the alkaline earth metal elements of Group 2a and the elements of the lanthanide series of the Periodic Table. The preferred cations are $NH_4$ and the rare earth cations.

The exchange may include a preliminary exchange at temperatures at or below the boiling point to partially exchange the sodium of the mordenite with the exchange cation. The exchanged mordenite may then be washed substantially free of anions used in the exchanging solution and then be re-exchanged under pressure.

Instead the entire mixture of the mordenite and the solution resulting from the exchange process may then be exchanged under autogenious pressure as described above.

The cation employed in the exchange under atmospheric pressure at or below the boiling point may be the same or different from that employed in the exchange under pressure.

The mixture entering the exchange under pressure or in preliminary exchange is preferably under acid pH conditions of about 3 to 5.5. The resultant pressure exchanged mordenite, washed substantially free of the anions used in the exchange is preferably combined with a matrix such as have been used with faujasite zeolites in producing petroleum cracking catalysts. The matrix may consist of clays such as the kaolin clays and inorganic oxides such as hydrated alumina, for example pseudoboehmite, silica, formed from silica gel, silica sols or silica-alumina gels. The exchanged mordenite may be used from about 5% to about 30% by weight of the mixed exchanged mordenite and matrix on a volatile free basis.

The mordenite according to our invention may be combined with the silica-alumina gel according to the process described in our copending application Ser. No. 769,118, now U.S. Pat. No. 4,142,995.

The mordenite either prior or subsequent to the exchange may be combined with the hydrothermally exchanged silica-alumina gel according to the process described in our copending applications, Ser. No. 3,879, and Ser. No. 3,793.

Where the unexchanged or the partially exchanged mordenite is combined with the silica-alumina cogel according to the process of said applications, the hydrothermal exchange will operate to hydrothermally treat the cogel and also exchange the mordenite according to the process in said applications.

Our preferred embodiment is to employ rare earth salts such as rare earth sulfate as the exchange solution and to mix the sodium mordenite with the exchange solution under acid conditions in the range of about 3 to 5 pH and after thorough agitation at said pH to exchange the mordenite in the resultant solution at superatmospheric pressure at temperatures between about 250° and 450° F. for a time sufficient to reduce the sodium content to the desired level preferably to less than 2% expressed as $Na_2O$ of the exchanged mordenite on a volatile free basis. Our invention will be further described in connection with the examples.

EXAMPLE 1

This example illustrates the degree of exchange attained employing multiple exchange at temperatures below the atmospheric boiling point of the exchange solution. Mordenite having an $SiO_2/Al_2O_3$ molar ratio of 10 and a $Na_2O$ content on a volatile free basis, of 6.5% of the mordenite, was exchanged with a solution of rare earth sulfate. The composition of the rare earth sulfate expressed as oxides and symbolized as ReO was:

$La_2O_3 = 57\%$ by weight
$CeO_2 = 16\%$ by weight
$Nd_2O_3 = 21\%$ by weight

Other rare earth oxides=7% by weight 100 grams of ReO (volatile free) is equal to 1.896 equivalents of ReO, i.e., 52.7 grams per equivalent.

The ReO, as in the examples, was determined by the standard oxalate method. See Roden, "Analytical Chemistry of the Manhatten Project", McGraw-Hill Co., Chapter 22. In all examples ReO was similarly determined and had the above equivalent value.

The rare earth sulfate solution contained 3.15 grams (expressed as ReO) per hundred ml. The slurry of the mordenite and the rare earth sulfate solution were mixed while adjusting the pH of the mixture to 3.5. The ratio of the ReO to the mordenite in the final mixture was ReO equal to 3.5% of the sodium mordenite on a volatile free basis. The mixture was maintained at ambient room temperature for 3 hours at a pH of 3 to 3.2 adjusting with sulfuric acid to maintain the pH. The slurry was then filtered and the filter cake was washed until the filtrate was substantially free of sulfate. The filter cake was analyzed as follows:

% $Na_2O$=4.4% on a volatile free basis
% ReO=1.96% on a volatile free basis

The exchanged mordenite filter cake was dried at 250° F. for 2 to 3 hours then calcined at 1250° F. for 3 hours. The calcined filter cake produced as above was dispersed gradually in the rare earth sulfate solution which contained 2 grams of ReO per hundred ml. while adjusting the pH to 3 during the mixture. The mixture was held at 160° F. for 2 hours and then filtered and the filter cake was washed until the filtrate was substantially free of sulfate ions. The filter cake was analyzed as follows:

$Na_2O$=2.85% on a volatile free basis
ReO=2.09% on a volatile free basis

The above filter cake was formulated into a cracking catalyst by mixing mordenite (19%) with aluminum hydrate (pseudoboehmite) (18%), acid treated halloysite (16%), ball clay (47%). As to the nature of the pseudoboehmite, and the acid treated halloysite, see Secor, et. al., U.S. Pat. No. 4,010,116.

When tested by the microactivity test described in the Oil and Gas Journal of Sept. 26, 1966, page 84, etc. and Nov. 22, 1975, page 60, etc., it had the following activities as shown in the example.

In the examples the conditions in carrying out the above tests are as follow. The calcined pelleted catalyst was first steamed at temperatures and for times specified below and then used in cracking of a petroleum fraction under the following conditions. The oil charge is a wide boiling range high sulfur feed stock (boiling range about 430° to 1000° F.). The catalyst to oil ratio is 4. The weight hourly space velocity is 16.45 grams of oil per gram of catalyst per hour. The temperature of the reactor is 910°. The percent conversion is reported as the volume of liquid condensate product of boiling point range of up to 421° F. based on the volume of liquid charge. The percent conversion when the catalyst is tested after calcination of the catalyst in air and steamed for two hours at 1450° F. is termed M activity. When the calcined sample is steamed at 1500° F. for two hours, prior to testing it is termed the S activity. When the calcined sample is first steamed for two hours at 1550° F., prior to testing it is termed S+ activity.

The determined activity was as follows:
M=35.3%
S=33.1%
S+=32.4%

EXAMPLE 2

The above mordenite (6.8% $Na_2O$) was exchanged with the above rare earth sulfate solution containing 1.5 grams of ReO per 100 ml. in the weight ratio of mordenite to Reo of 5:3 on a volatile free basis. The pH was adjusted during mixing to hold a pH of 3 by the addition of sulfuric acid. The mixture was held for one hour at the above pH at ambient room temperature while stirring to maintain a uniform dispersion. The stirred slurry was then transferred to a autoclave and heated to 355° F. for three hours under autogenious pressure. The digested slurry was cooled, filtered and washed until the filtrate was substantially free of $SO_4$ ions. The filter cake was analyzed as follows:

$Na_2O$=1.50% on a volatile free basis
ReO=2.37% on a volatile free basis
$Al_2O_3$=13.6% on a volatile free basis
$SiO_2$=79.6% on a volatile free basis It was formulated with the matrix material as in Example 2 and tested for activity as in Example 2 with the following results:

M=72.8%
S+=28.9%

The exchange at the elevated temperature and superatmospheric pressure had improved the M activity substantially. The catalyst of Example 3 compared favorably with the commercially available catalysts produced from the so-called Y zeolites (see U.S. Pat. No. 4,100,108).

We claim:

1. A process of exchanging sodium mordenite containing sodium, expressed as $Na_2O$, of substantially greater than 2% of the mordenite on a volatile free basis, which comprises heating said mordenite in an acid solution or an acid solution containing $NH_4$ or polyvalent cations or mixtures of said cations at a temperature of about 250° F. to about 500° F. and removing mordenite from the solution, said mordenite containing sodium, expressed as $Na_2O$ of less than 2% of the exchanged mordenite on a volatile free basis.

2. The process of claim 1 in which the polyvalent cation is a rare earth cation.

3. The process of claim 1 in which the sodium content of the mordenite which is exchanged is in excess of 6%.

4. The process of claim 2 in which the sodium content of the mordenite which is exchanges is in excess of 6%.

* * * * *